(12) United States Patent
Oak

(10) Patent No.: US 6,437,880 B1
(45) Date of Patent: Aug. 20, 2002

(54) APPARATUS AND A METHOD FOR INDICATING A CALL CHARGE ON A DISPLAY OF A FACSIMILE DEVICE

(75) Inventor: Seung-Soo Oak, Kyonggi-do (KR)

(73) Assignee: Samsung Electronics, Co., Ltd., Suwon (KR)

(*) Notice: Subject to any disclaimer, the term of this patent is extended or adjusted under 35 U.S.C. 154(b) by 0 days.

(21) Appl. No.: 09/201,148

(22) Filed: Nov. 30, 1998

(30) Foreign Application Priority Data

Nov. 28, 1997 (KR) .......................................... 97/63639

(51) Int. Cl.[7] ................................................ H04N 1/00
(52) U.S. Cl. ...................... 358/400; 358/402; 358/403; 358/434; 379/100.01; 379/100.04; 379/100.06
(58) Field of Search ........................ 358/400, 434–436, 358/438, 439, 468, 402–403; 379/100.04, 100.01, 100.12, 114.01, 93.23, 100.06; 377/111

(56) References Cited

U.S. PATENT DOCUMENTS

| | | | |
|---|---|---|---|
| 4,264,956 A | * 4/1981 | Delaney | 364/467 |
| 4,726,056 A | * 2/1988 | An et al. | 379/115 |
| 4,825,462 A | * 4/1989 | Lewiner et al. | 379/131 |
| 4,891,836 A | * 1/1990 | Takahashi | 379/100 |
| 4,926,325 A | * 5/1990 | Benton et al. | 340/5.74 |
| 5,117,258 A | * 5/1992 | Iwata | 399/79 |
| 5,146,344 A | * 9/1992 | Bennett et al. | 358/296 |
| 5,325,290 A | * 6/1994 | Cauffman et al. | 379/114.01 |
| 5,381,242 A | * 1/1995 | Fujii | 358/400 |
| 5,559,871 A | * 9/1996 | Smith | 379/114.01 |
| 5,568,280 A | * 10/1996 | Wells et al. | 358/400 |
| 5,577,100 A | * 11/1996 | McGregor et al. | 455/406 |
| 5,835,240 A | * 11/1998 | Kobayashi et al. | 358/468 |
| 5,898,763 A | * 4/1999 | Azuma et al. | 379/100.04 |
| 5,940,482 A | * 8/1999 | Choi | 379/124 |
| 6,002,755 A | * 12/1999 | Krank et al. | 379/130 |
| 6,026,380 A | * 2/2000 | Weiler et al. | 355/133 |
| 6,104,792 A | * 8/2000 | Lautenschlager et al. | 379/114 |
| 6,151,388 A | * 11/2000 | Nakamura | 379/114 |
| 6,243,450 B1 | * 6/2001 | Jansen et al. | 379/100.04 |

FOREIGN PATENT DOCUMENTS

EP         0920187         * 6/1999         ............ H04N/1/32

OTHER PUBLICATIONS

The Communication Handbook, Jerry D. Gibson, CRC Press, IEEE Press, pp. 577–579.*

* cited by examiner

Primary Examiner—Edward Coles
Assistant Examiner—Tia A. Carter
(74) Attorney, Agent, or Firm—Robert E. Bushnell, Esq.

(57) ABSTRACT

An apparatus and a method for indicating a call charge on a display of a facsimile device determines whether a message which is included in a D-channel of service information is a facility message or a display message. If the message is a facility message, the call charge is calculated by multiplying the number of calls included in the facility message by a call rate, and the call charge is outputted to a display window and/or a printer. If the message is a display message, the call charge included in the display message is detected, and the call charge is outputted to the display window and/or the printer. Accordingly, a user can identify the call charge easily and conveniently.

23 Claims, 6 Drawing Sheets

| | | |
|---|---|---|
| 0 0 0 1 1 1 0 0  Information element | 1  OCTECT | 1CH |
| Length of facility | 2 | XXH |
| 1 0 0 1 0 0 0 1  Service discriminator | 3 | 91H |
| 1 0 1 0 0 0 0 1  Component tag | 4 | A1H |
| 0  Length of facility | 5 | XXH |
| 0 0 0 0 0 0 1 0  Invoke component tag | 6 | 02H |
| 0  Length of invoke identifier | 7 | 02H |
| Invoke identifier | 8 | xxH |
| Invoke identifier | 9 | xxH |
| 0 0 0 0 0 0 1 0  Operation value tag | 10 | 02H |
| 0  Length of operation value | 11 | 01H |
| Operation value | 12 | 24H |
| Operation specific field | 13 — | |

APPARATUS AND A METHOD FOR INDICATING A CALL CHARGE ON A DISPLAY OF A FACSIMILE DEVICE

CLAIM OF PRIORITY

This application makes reference to, incorporates the same herein, and claims all benefits accruing under 35 U.S.C. §119 from an application for AN APPARATUS AND A METHOD FOR INDICATING A CALL CHARGE ON A DISPLAY OF A FACSIMILE DEVICE earlier filed in the Korean Industrial Property Office on the 28th of November 1997 and there duly assigned Serial No. 63639/1997.

BACKGROUND OF THE INVENTION

1. Technical Field

The present invention relates to an apparatus and a method for indicating a call charge on a display of a facsimile device and, more particularly, to an apparatus and a method for indicating a call charge on the display of a facsimile device by using service information for indicating the call charge provided from an exchange.

2. Related Art

Generally, a facsimile device includes a printer for printing data on a recording medium, a scanner for scanning a document, a modem for transferring and receiving data to/from a remote facsimile device, and an operating panel including a number of function keys. The operating panel has a display window to indicate information with respect to the operation of the facsimile device. The scanner scans a document to obtain document data, and the modem transfers the document data to the remote facsimile device, and receives facsimile data transferred from the remote facsimile device. Finally, the printer prints the facsimile data.

In facsimile communication using a public switching telephone network (hereinafter, referred to as PSTN), there are two ways to calculate a call charge after a communication is completed. One way is to obtain the call charge by multiplying a transfer time by the number of calls and a call charge rate. The other way is to obtain the call charge by using service information, indicating the call charge, provided by an exchange.

With respect to the latter method, involving use of service information provided by the exchange, the exchange transfers a specified signal to the transmission side facsimile device at predetermined time intervals during the call. The transmission side facsimile device or a private exchange detects the number of specified signals received, and calculates the call charge by multiplying the number of received specified signals by a call charge rate. Thus, the transmission side facsimile device must have a call charge calculating program to calculate the call charge based on the number of received specified signals and the call charge rate.

As described above, the facsimile device has a display window to indicate the call charge. However, since some facsimile devices have no apparatus for calculating and indicating the call charge, the user must determine the duration of the call and calculate the call charge by multiplying the duration by the call charge rate.

The calculation of the call charge for a call in the same local area is simple. However, for long distance or international calls, calculation is more complex since the call charge must be calculated by multiplying the duration of the call by different call charge rates.

With respect to calculation of the call charge as described above, matters can be facilitated for calculation of the call charge for a facsimile device in the same local area, but different call charge rates must be set for long distance calls and international telephone service. Therefore, it is required that a program capable of calculating these call charges using different call charge rates be applied to the facsimile device. In the end, the user must remember the call charge rates according to the types of telephone calls, such as a long distance call or an international telephone call, or the facsimile device must contain a program capable of perform the more complex calculation of call charge according to the types of telephone (long distance or international telephone service).

Furthermore, when the call charge is calculated by multiplying the duration of a call by the call charge rate, there is a disadvantage in that, when the call charge rate is changed by the telecommunication service, the call charge rate must be reset in the facsimile device.

SUMMARY OF THE INVENTION

The present invention has been developed to overcome the above described problem. It is a first object of the present invention to provide a method for indicating a call charge on the display of a facsimile device by using data for the call charge provided through a communication line to which the facsimile device is connected.

It is a second object of the present invention to provide an apparatus for indicating a call charge on the display of a facsimile device by using data for the call charge as provided through a communication line to which the facsimile device is connected.

To accomplish the above objects of the present invention, according to a first aspect of the present invention, there is provided a method for indicating a call charge on the display of a facsimile device, comprising the steps of: determining whether call charge information, which is included in service information for indicating a call charge, is a facility message or a display message; if the call charge information is the facility message, detecting a number of calls from the facility message and calculating a call charge by multiplying the number of calls by a call rate which is already set by a call rate setting process; if the call charge information is the display message, detecting a call charge from the display message; and displaying the calculated call charge or the detected call charge on the display of the facsimile device.

The method for indicating the call charge on the display of the facsimile device further comprises the steps of: setting and storing the calculated call charge or the detected call charge as a present call charge; and calculating a total call charge by adding the present call charge to a stored and accumulated call charge and storing the total call charge.

The call rate setting process includes the steps of setting a call rate setting function and inputting a desired call rate; and storing the desired call rate.

The method for indicating the call charge on the display of the facsimile device further comprises the steps of: checking as to whether or not a printing function is set; and outputting the calculated call charge or the detected call charge to a printer in a predetermined printing form.

The predetermined printing form includes at least some of the following information: the day, the time, a telephone number at the receiving end, the present call charge, and the total call charge.

According to a second aspect of the present invention, there is provided an apparatus for indicating a call charge on the display of a facsimile device, comprising: information receiving means for receiving image data providing service information for indicating a call charge; information detecting means for detecting a type of message in a D-channel, numbers of call, and data for the call charge from the image data received in the information receiving means; calculating means for calculating the call charge by multiplying the number of calls by a call rate already set, when the type of the message which is detected in the information detecting means is a facility message; call charge outputting means for outputting the call charge calculated in the calculating means or the call charge detected in the information detecting means; means for displaying the call charge outputted by the call charge outputting means so that a user can recognize the call charge; and a controller for controlling all of the above means.

The apparatus for indicating the call charge on the display of the facsimile device further comprises a memory for storing the call charge outputted by the call charge outputting means as a present call charge, and for storing a total call charge after adding the present call charge to a stored is and accumulated call charge.

The type of message in the D-channel is one of the following: a facility message including data as to the number of calls; and a display message including data for the call charge.

The call charge indicating means includes at least one of the following: a display window which is mounted on the facsimile device and indicates the call charge; and a printer for printing the call charge in a predetermined printing form, the printer being associated with the facsimile device and capable of communicating with it.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Hereinafter, an apparatus and a method for indicating a call charge on the display of a facsimile device according to the present invention will be described in detail with reference to accompanying drawings.

Figure 1:
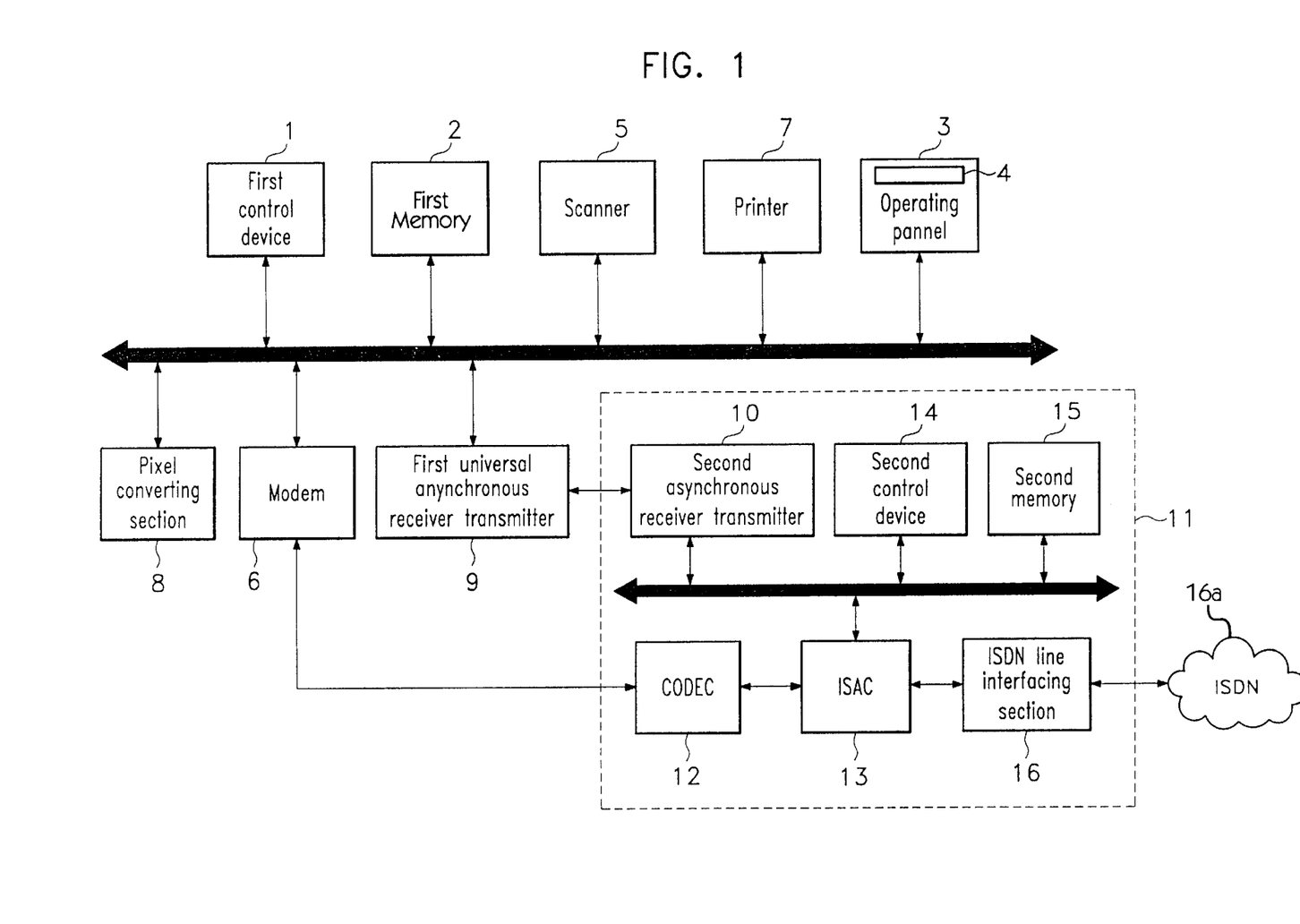
FIG. 1 is a schematic block diagram showing an apparatus for indicating a call charge on a display of a facsimile device according to the present invention.

FIG. 1 is a schematic block diagram of an apparatus for indicating a call charge on the display of a facsimile device according to the present invention.

As shown in FIG. 1, a first controlling section or device 1 generally controls the facsimile device according to a program. A first memory 2 has program data, protocol data, character data, and data regarding transmission and reception of the above data stored therein. The data are stored in the first memory 2 in accordance with the control of the first controlling section 1. An operating panel 3 includes a plurality of keys (not shown) to generate key data in the facsimile device and a window 4 to indicate the key data. When the key data are generated, the first controlling section 1 receives the key data and transfers the key data to the window 4.

A scanner 5 scans document data, and converts the document data into digital image data. Then, the scanner 5 provides the image data to the first controlling section 1. A modem 6 modulates data outputted from the first controlling section 1 to provide an analog signal output, or demodulates a received analog signal to form a digital signal according to the control signal of the first controlling section 1.

A printer 7 prints facsimile data received therein according to the control signal of the first controlling section 1. A pixel converting section 8 converts the facsimile data received in the modem 6 or the document data scanned by the scanner 5 into a bit stream to be recognized by the printer 7, or converts the bit stream into image data.

A first universal asynchronous receiver/transmitter (hereinafter, respectively referred to as UART) 9 and a second UART 10 transmit and receive information to be displayed to the user, and transmit and receive control information to/from each other after analyzing information on a D-channel between a main board (not shown) and an interfacing board 11. A CODEC 12 encodes modulated analog image and voice signals from the modem 6 into digital image and voice signals, and transmits the digital image and voice signals to another facsimile device through a communication line, or CODEC 12 decodes digital image data received from the communication line into analog image data, and transmits the analog image data to the modem 6. ISAC 13 performs protocol for the facsimile device connected to the communication line.

A second controlling section or device 14 exchanges information with the first controlling section 1, and generally controls the interfacing board 11 according to the first controlling section 1. A second memory 15 has various programs performed by the second controlling section 14. A communication line interfacing section or integrated service digital network (ISDN) line interfacing section 16 interfaces various signals and data between the communication line of this facsimile device and a communication line of another facsimile device via ISDN 16a.

Figure 2:
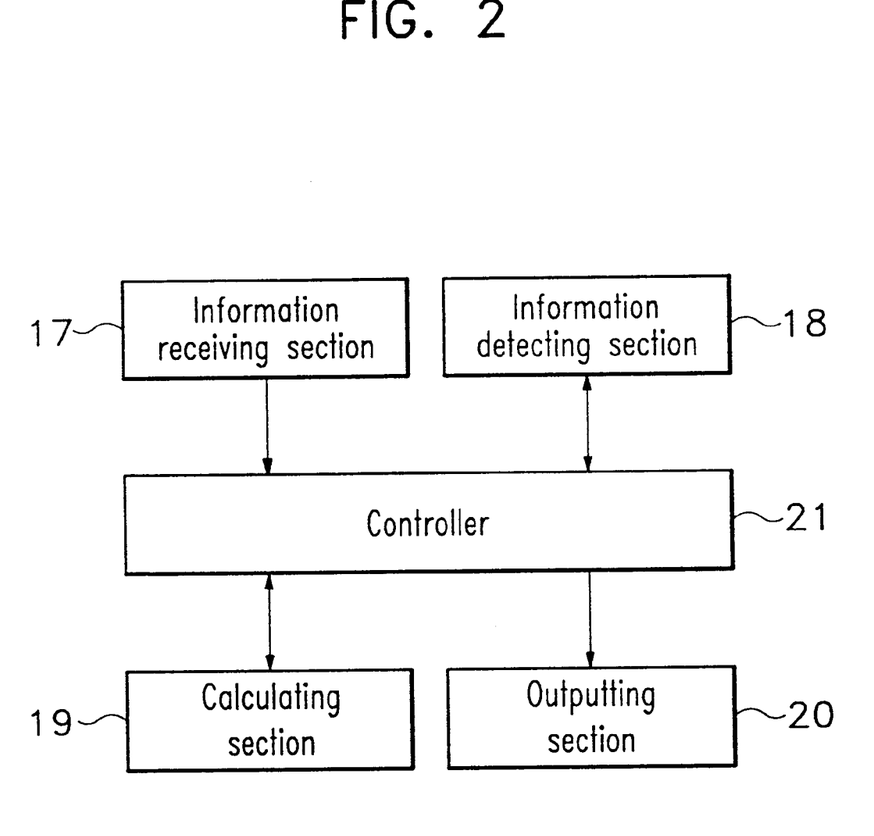
FIG. 2 is a detailed block diagram showing a first control device of FIG. 1.

FIG. 2 is a detailed block diagram of the first controlling section or device 1 shown in FIG. 1. Referring to FIG. 2, an information receiving section 17 receives display information from the communication line. An information detecting section 18 detects information for a call charge and the type of call charge information are included in the display information received from the communication line. A calculating section 19 calculates the present call charge in proportion to the numbers of calls, and adds the present call charge to an accumulated call charge. An outputting section 20 outputs the present call charge and the accumulated call charge to the window 4 or the printer 7 (FIG. 1) so that the user can identify the present call charge and the accumulated call charge. A controller 21 controls the above sections 17–20 to perform the respective functions thereof.

Hereinafter, the operation of the apparatus for indicating the call charge on the display of the facsimile device according to the present invention will be described in detail with respect to FIGS. 3 to 6.

The facsimile device shown in FIG. 1 has functions and elements almost similar to those of the usual facsimile device. Accordingly, such identical or similar functions and elements are omitted herein, and only functions and elements unique to the facsimile device of the present invention will be described. In the facsimile device as shown in FIG. 1, a main board (not shown) is connected to the interfacing board 11 through the first UART 9 and the second UART 10. When receiving data relating to the service information for indicating the call charge, as transmitted from the communication line through the interfacing board 11, the second controlling section 14 analyzes the service information data. Then, the second controlling section 14 transfers the service information data to the main board (not shown) through the first UART 9 and second UART 10. The first controlling section 1 on the main board analyzes the service information data and outputs it to the display window 4 of the operating panel 3.

Figure 3:
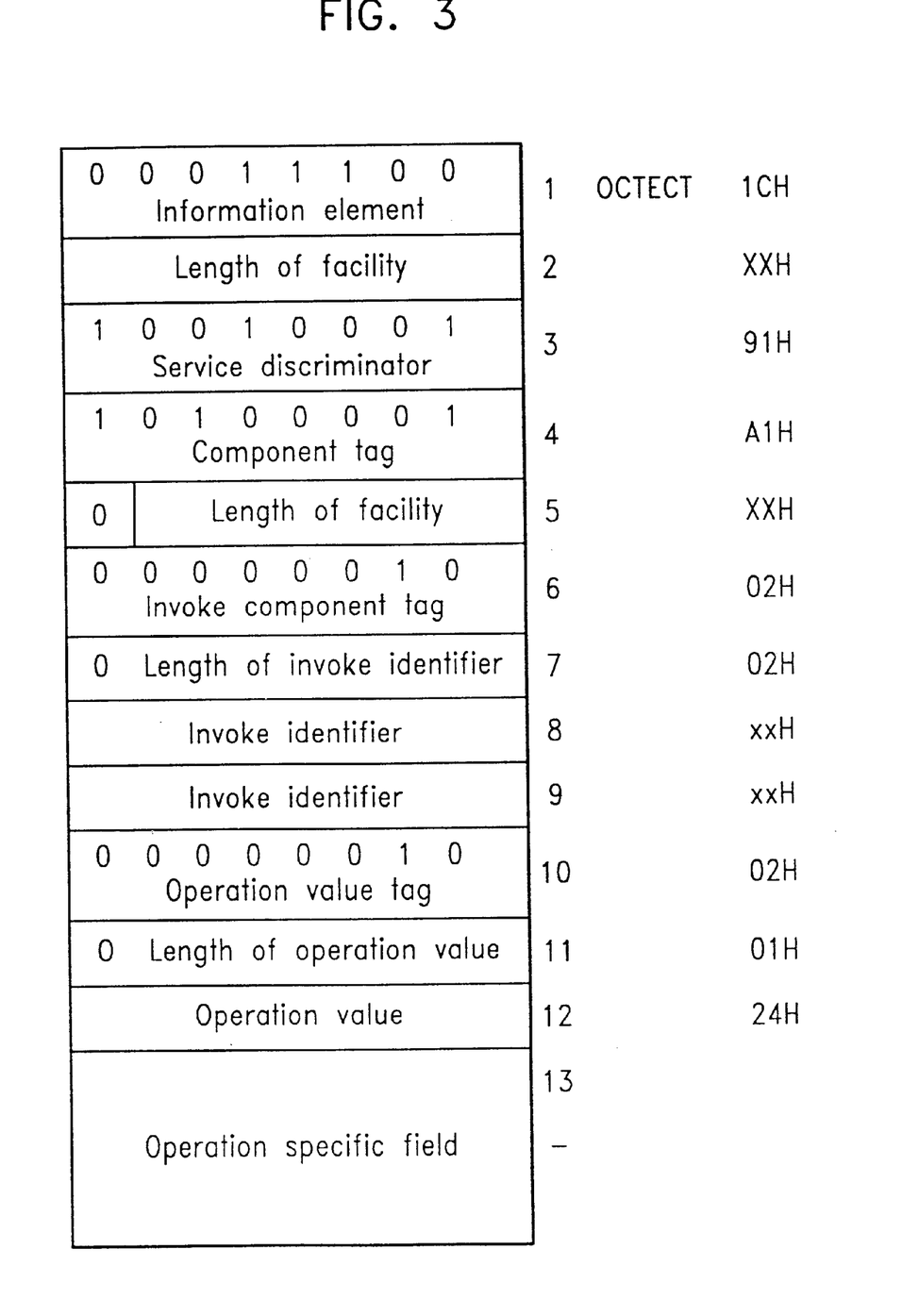
In FIG. 3 shows a data format of a facility message included in service information for indicating a call charge.
Figure 4:
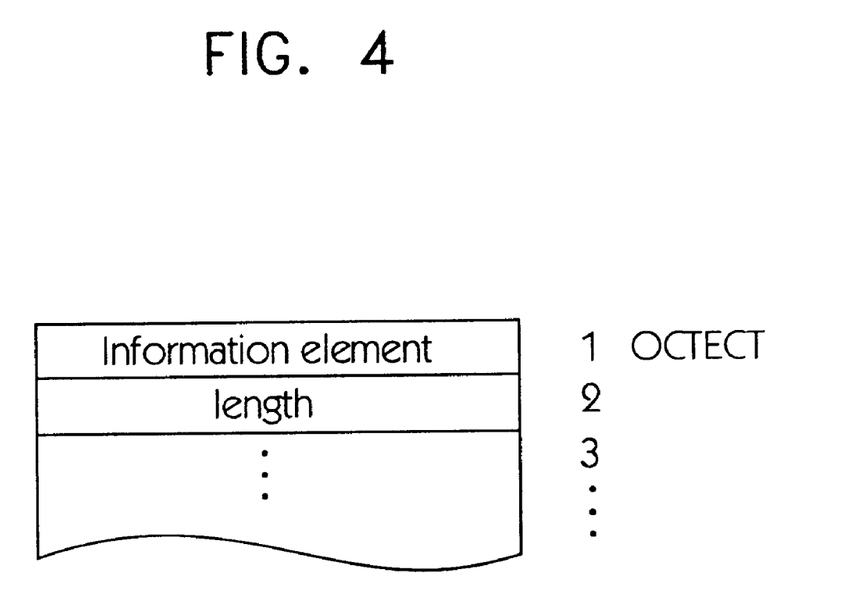
FIG. 4 shows a data format of a display message included in service information for indicating a call charge.
Figure 5:
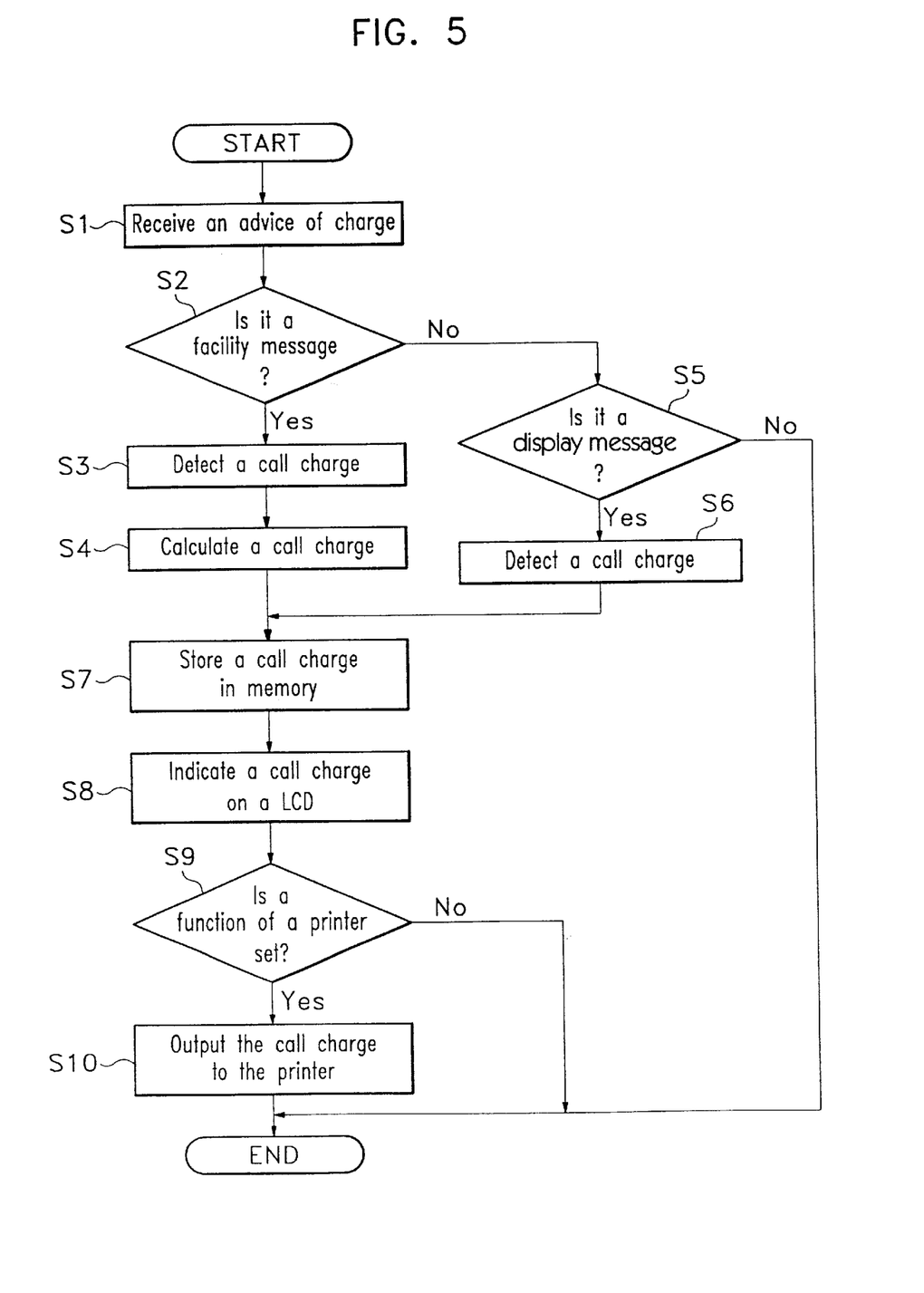
FIG. 5 is a flow chart showing a process of indicating the call charge on the display of the facsimile device according to the present invention.

A process for displaying call charge information on the display window 4 of the facsimile device after every call is shown in FIG. 5. Many countries have different types of call charge information, which are generally included in a layer 3 message. Some countries provide a facility message, which includes the number of calls, to the user so that the user can calculate the call charge as shown in FIG. 3, while other countries provide a display message which includes the call charge for the user as shown in FIG. 4. Accordingly, the present invention provides an apparatus and method for displaying and printing the call charge in the facsimile device regardless of the type of layer 3 message.

The ISAC 13 divides the messages received in the facsimile device as D-channel data through the line interfacing section 16 of the interfacing board 11 into facility and display messages, as shown in FIGS. 3 and 4, respectively. The second controlling section 14 transmits the divided messages to the first UART 9 through the second UART 10. The first UART 9 receives the messages and transmits an interrupt signal to the first controlling section 1, reporting the reception of the messages to the first controlling section 1. The first controlling section 1 then processes the interrupt signal as shown in FIG. 5.

When the first controlling section 1 receives the interrupt signal in step S2, the information receiving section 17 of the first controlling section 1 determines whether the received message is a facility message or a display message in step S2. If the received message is a facility message as shown in FIG. 3, the information detecting section 18 determines the number of calls in step S3. The calculating section 19 calculates the call charge by multiplying the number of calls by the call charge rate (already set) in step S4.

On the other hand, if the received message is not a facility messages as determined in step S2, the first controlling section 1 determines whether the received message is a display message in step S5. If the received message is a display message as shown in FIG. 4, the information detecting section 18 need not perform a separate calculating process; it detects data relating to the call charge, as included in the display message, in step S6. The first controlling section 1 stores the data for the call charge detected in steps S4 or S6 in the first memory 2 in the step S7.

The first memory 2 stores the present call charge and the accumulated call charge as the above steps are repeatedly carried out. The first controlling section 1 detects the present call charge stored in the first memory 2 when the call is completed, and outputs the present call charge to the display window 4 of the operating panel 3 through the outputting section 20. Accordingly, the present call charge is displayed in the display window 4 (e.g., a liquid crystal display or LCD) in step S8.

Furthermore, the first controlling section 1 checks whether the printing function is set in printer 7 in step S9. If the printing function is set, the first controlling section 1 outputs the information relating to the present call charge or the accumulated call charge, as required by the user to the printer 7 through the outputting section 20 in step S10. Thus, the user can identify the call charge from the printout of printer 7 (as well as from display window 4).

The first memory 2 stores the day, time and telephone numbers of each call, as well as the present call charge and the accumulated call charge, in a table. Each datum can be selectively outputted from the first memory 2 according to the printing form required by the user.

Figure 6:
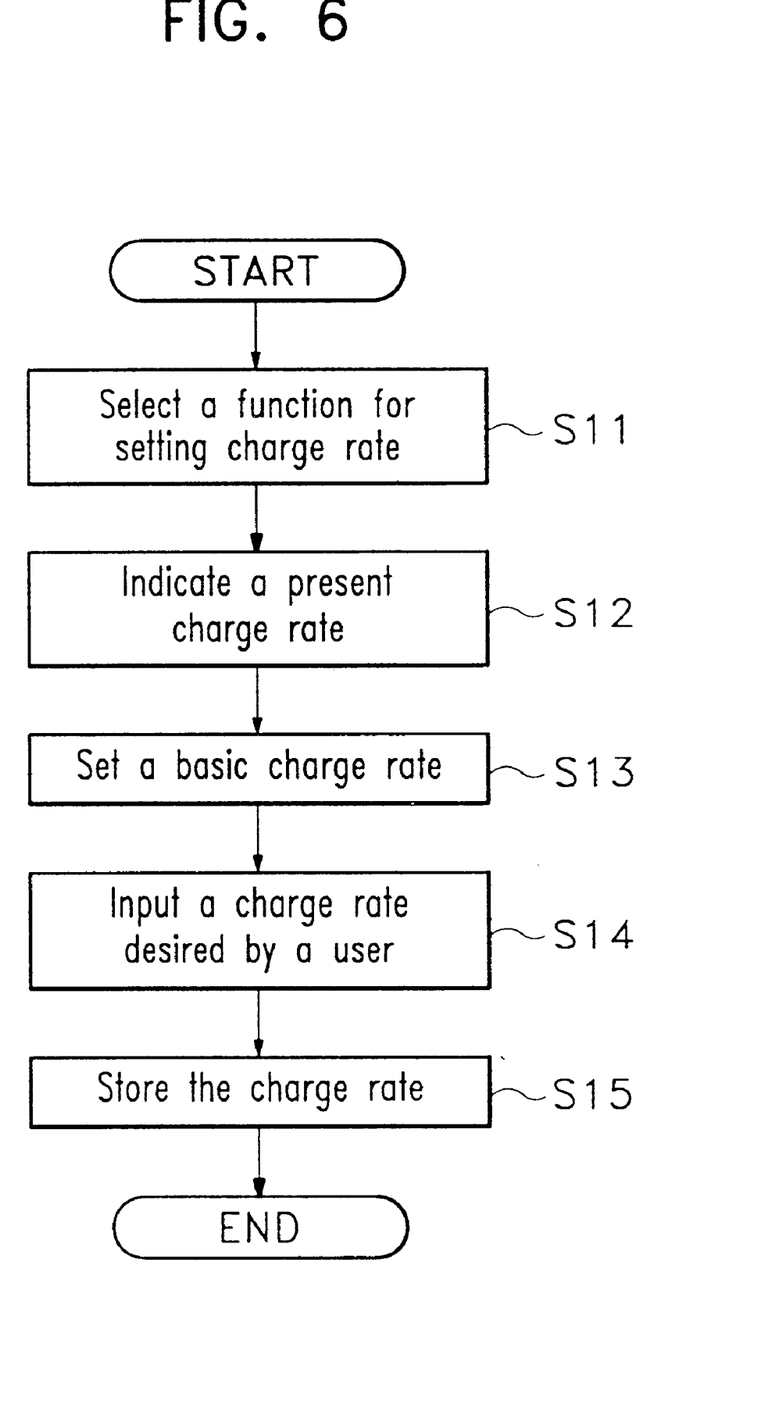
FIG. 6 is a flow chart showing a process of inputting a call charge rate according to the present invention.

FIG. 6 is a flow chart showing a process of calculating a call charge by inputting the call charge rate. The call charge rate is provided by a service provider, such as a hotel, which supplies a facsimile transmitting service. After the call is completed, the user is informed of the total call charge by the service provider.

If the user or the service provider selects a function for setting the call charge rate in step S11, the first controlling section 1 detects the present call charge rate stored in the first memory 2 and outputs the present call charge rate to the window 4 through the outputting section 20 in step S12. The first controlling section 1 sets the present call charge rate indicated in the display window 4 as a reference call charge rate in step S13.

Then, if the user or the service provider inputs a desired call charge rate in step S14, data for the desired call charge rate are stored in the first memory 2 as data for a set call charge rate in step S15. Thus, the process of inputting the call charge rate is completed. The call charge rate, which is set in the manner described above, is used in the process of calculating the call charge rate in step S4 as shown in FIG. 5. The call charge is calculated in correspondence to the number of calls.

Finally, the present call charge and the total of all call charges are outputted to the display window 4 and the printer 7 according to the number of calls and the call charge rate set by the user or the service provider. Accordingly, the user can identify the call charge information easily.

According to the present invention, even though the message included in the service information for indicating the call charge is a facility message or a display message, the apparatus for indicating the call charge can indicate the call charge.

Since the apparatus for indicating the call charge detects the information for the call charge included in the D-channel of the service call charge information, and displays the call charge, the user identifies the call charge conveniently, and the service provider manages the information and call charge for the user easily.

Furthermore, the apparatus for indicating the call charge according to the present invention can detect the call charge from all kinds of messages, and displays the call charge on the display of a facsimile device, such as a display window, regardless of whether the information for the call charge included in the D-channel is a facility message or a display message.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A method for indicating a call charge on a display of a facsimile device, comprising the steps of:

determining whether call charge information which is included in a service information for indicating the call charge is a facility message indicating a number of calls or a display message indicating the call charge;

when the call charge information is the facility message, detecting the number of calls from the facility message and calculating the call charge by multiplying the number of calls by a call rate which is present;

when the call charge information is the display message, detecting the call charge from the display message; and displaying the calculated call charge on the display of the facsimile device when the call charge information is the facility message, and displaying the detected call charge on the display of the facsimile device when the call charge information is the display message.

2. The method as claimed in claim 1, further comprising the steps of:

setting and storing said one of the calculated call charge and the detected call charge as a present call charge;

calculating a total call charge by adding the present call charge to a stored and accumulated call charge; and storing the total call charge.

3. The method as claimed in claim 1, wherein the call rate is preset by a call rate setting process which includes the steps of:

setting a call rate setting function;

inputting a desired call rate; and storing the desired call rate.

4. The method as claimed in claim 1, further comprising the steps of:

determining whether a printing function is set; and when the printing function is set, outputting one of the calculated call charge and the detected call charge to a printer in a predetermined form.

5. The method as claimed in claim 4, wherein the predetermined form includes at least one of a day, a time and a telephone number at a receiving end for a call, a present call charge, and a total call charge.

6. An apparatus for indicating a call charge on a display of a facsimile device, comprising:

information receiving means for receiving image output data corresponding to service information for indicating the call charge;

information detecting means for detecting a type of message in a D-channel, a number of calls, and the call charge from the image output data received by the information receiving means, wherein the type of message in the D-channel is one of a facility message and a display message;

calculating means for calculating the call charge by multiplying the number of calls by a call rate when the type of message detected by the information detecting means is the facility message;

call charge output means for outputting the call charge calculated by the calculating means when the type of message detected by the information detecting means is the facility message and for outputting the call charge detected by the information detecting means when the type of message detected by the information detecting means is the display message; and display means for displaying the call charge outputted by the call charge output means so that a user can recognize the call charge.

7. The apparatus as claimed in claim 6, further comprising control means for controlling said information receiving means, said information detecting means, said calculating means, said call charge output means and said display means.

8. The apparatus as claimed in claim 6, further comprising a memory for storing the call charge outputted by the call charge output means as a present call charge, and for storing a total call charge obtained by adding the present call charge to an accumulated call charge previously stored in said memory.

9. The apparatus as claimed in claim 6, wherein the facility message includes data as to the number of calls.

10. The apparatus as claimed in claim 6, wherein the display message includes data as to the call charge.

11. The apparatus as claimed in claim 6, wherein the display means includes a display window mounted on the facsimile device for displaying the call charges.

12. The apparatus as claimed in claim 6, wherein the display means includes a printer associated with and communicating with the facsimile device for printing the call charge in a predetermined printing form.

13. The apparatus as claimed in claim 12, wherein the predetermined printing form includes at least one of a day, a time and a telephone number at a receiving end for a call, the present call charge, and the total call charge.

14. An apparatus for indicating a call charge on a display of a facsimile device, comprising:

determining means for determining whether call charge information is a facility message indicating a number of calls or a display message indicating the call charge;

detecting means for detecting the number of calls from the facility message when the call charge information is the facility message;

calculating means for calculating the call charge by multiplying the number of calls by a call rate when the call charge information is the facility message;

additional detecting means for detecting the call charge from the display message when the call charge information is the display message; and display means for displaying the calculated call charge on the display of the facsimile device when the call charge information is the facility message, and for displaying the detected call charge on the display of the facsimile device when the call charge information is the display message.

15. The apparatus as claimed in claim 14, further comprising means for setting and storing said one of the calculated call charge and the detected call charge as a present call charge;

wherein said calculating means calculates a total call charge by adding the present call charge to an accumulated call charge previously stored.

16. The apparatus as claimed in 14, further comprising call rate setting means for setting the call rate.

17. The apparatus as claimed in 14, further comprising:

means for determining whether a printing function is set; and output means for outputting said one of the calculated call charge and the detected call charge to a printer in a predetermined printing form when the printing function is set.

18. The apparatus as claimed in 17, wherein the predetermined printing form includes at least one of a day, a time and a telephone number at a receiving end for a call, a present call charge, and a total call charge.

19. The apparatus as claimed in 14, wherein said determining means comprises an information receiving section of said facsimile device.

20. The apparatus as claimed in 14, wherein said detecting means comprises an information detecting section of said facsimile device.

21. The apparatus as claimed in 14, wherein said calculating means comprises a calculating section of said facsimile device.

22. The apparatus as claimed in 14, wherein said additional detecting means comprises an information detecting section of said facsimile device.

23. The apparatus as claimed in 14, wherein said display means comprises at least one of a display window and a printer of said facsimile device.

* * * * *